(12) United States Patent
Tahara et al.

(10) Patent No.: US 10,423,051 B2
(45) Date of Patent: Sep. 24, 2019

(54) CAMERA MODULE

(71) Applicant: Panasonic Intellectual Property Management Co., Ltd., Osaka (JP)

(72) Inventors: Hiroyuki Tahara, Kanagawa (JP); Takehiro Ueda, Shiga (JP); Kazuo Sibukawa, Kanagawa (JP); Atsuki Kamatani, Kanagawa (JP); Yoshiyuki Hotta, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/950,211

(22) Filed: Apr. 11, 2018

(65) Prior Publication Data

US 2018/0231872 A1    Aug. 16, 2018

Related U.S. Application Data

(63) Continuation of application No. PCT/JP2017/003092, filed on Jan. 30, 2017.

(30) Foreign Application Priority Data

Mar. 30, 2016 (JP) .................. 2016-068527

(51) Int. Cl.
*G03B 17/12* (2006.01)
*G03B 17/02* (2006.01)
(Continued)

(52) U.S. Cl.
CPC ............. *G03B 17/12* (2013.01); *G02B 7/021* (2013.01); *G02B 7/022* (2013.01); *G03B 17/02* (2013.01); *H04N 5/2254* (2013.01)

(58) Field of Classification Search
USPC ........................................... 396/529
See application file for complete search history.

(56) References Cited

U.S. PATENT DOCUMENTS

| | | | | |
|---|---|---|---|---|
| 6,097,026 A | * | 8/2000 | Tsai ............... | H04N 1/03 250/239 |
| 6,157,467 A | * | 12/2000 | Tsai ............... | H04N 1/03 358/483 |

(Continued)

FOREIGN PATENT DOCUMENTS

| | | |
|---|---|---|
| JP | 2007-150708 | 6/2007 |
| JP | 2007-174358 | 7/2007 |
| JP | 4652149 B | 3/2011 |

OTHER PUBLICATIONS

International Search Report of PCT application No. PCT/JP2017/003092 dated May 9, 2017.

*Primary Examiner* — Clayton E. LaBalle
*Assistant Examiner* — Warren K Fenwick
(74) *Attorney, Agent, or Firm* — Greenblum & Bernstein, P.L.C.

(57) ABSTRACT

A camera module includes a substrate having a first main surface mounted with an image sensor, a second main surface on the reverse side of the substrate from the first main surface in the predetermined direction, and is provided with at least one hole extending from the first main surface in the predetermined direction. The camera module further includes a holder which has a boss inserted from the first main surface into the at least one hole, and holds at least one lens. The camera module further includes a fixing part made of adhesive that is cured into an anchor shape. The fixing part fixes the boss inside the at least one hole.

12 Claims, 12 Drawing Sheets

(51) Int. Cl.
    *H04N 5/225*     (2006.01)
    *G02B 7/02*     (2006.01)

(56) References Cited

U.S. PATENT DOCUMENTS

| | | | |
|---|---|---|---|
| 7,619,680 B1 * | 11/2009 | Bingle | B60R 11/04 |
| | | | 348/342 |
| 7,980,773 B2 * | 7/2011 | Aoki | G03B 17/48 |
| | | | 359/819 |
| 8,670,659 B2 * | 3/2014 | Haruguchi | G03B 3/10 |
| | | | 396/133 |
| 10,054,799 B2 * | 8/2018 | Park | G02B 27/646 |
| 2012/0230670 A1 * | 9/2012 | Hirooka | H01L 27/14618 |
| | | | 396/529 |
| 2014/0340487 A1 * | 11/2014 | Gilliland | G01S 7/4863 |
| | | | 348/48 |
| 2015/0195438 A1 * | 7/2015 | Park | H04N 5/2253 |
| | | | 348/345 |
| 2015/0212293 A1 * | 7/2015 | Bang | G03B 3/10 |
| | | | 348/360 |
| 2016/0088398 A1 * | 3/2016 | Kim | H04R 7/18 |
| | | | 381/395 |
| 2016/0377947 A1 * | 12/2016 | Scepanovic | G02B 13/0075 |
| | | | 455/566 |

\* cited by examiner

CAMERA MODULE

CROSS-REFERENCE TO RELATED APPLICATIONS

This application is a continuation of the PCT International Application No. PCT/JP2017/003092 filed on Jan. 30, 2017, which claims the benefit of foreign priority of Japanese patent application No. 2016-068527 filed on Mar. 30, 2016, the contents all of which are incorporated herein by reference.

BACKGROUND

1. Technical Field

The present disclosure relates to a camera module including a substrate and a lens barrel fixed to the substrate with adhesive.

2. Description of the Related Art

One such camera module known in the art is disclosed in Japanese Patent No. 4652149. This camera module includes a lens, an imaging element which converts light passing through the lens into an image, a substrate which holds the imaging element, and a case which holds the lens and the substrate.

The case has a support member extending along the optical axis of the lens. The substrate is provided with a through-hole having an inner diameter larger than an outer diameter of the support member, so that the support member is inserted into the through-hole. The substrate is fixed to a side surface of the support member by means of a fixing means, thereby being fixed to the case. The fixing means is made by solidifying the means in a liquid state. The imaging element and the substrate are spaced from the lens and the case, and are positioned with respect to the case only by the fixing means and the support member.

SUMMARY

The present disclosure is directed to a camera module including a substrate having a first main surface mounted with an image sensor, a second main surface on the reverse side of the substrate from the first main surface in the predetermined direction, and being provided with a hole extending from the first main surface in the predetermined direction. The camera module further includes a holder having a boss inserted into the hole from the first main surface. The holder holds at least one lens. The camera module further includes a fixing part made of adhesive that is cured into an anchor shape. The fixing part fixes the boss inside the hole.

The present disclosure provides a camera module that is unlikely to cause displacement of the holder with respect to the image sensor.

DETAILED DESCRIPTION OF PREFERRED EMBODIMENTS

Figure 1:
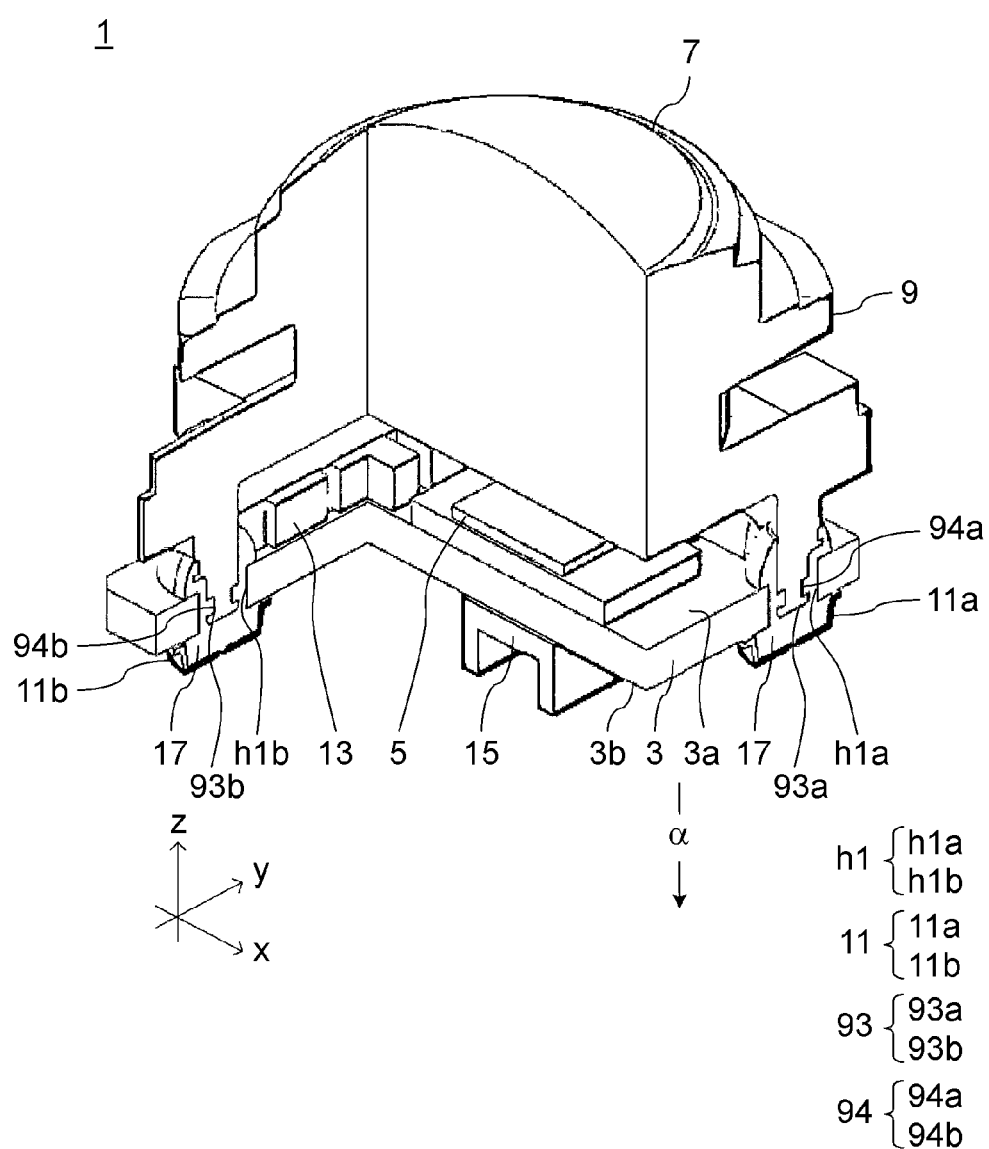
FIG. 1 is a partial sectional view of a camera module according to a first exemplary embodiment of the present disclosure.

Prior to describing exemplary embodiments of the present disclosure, problems known in the art will now be described briefly. In camera modules known in the art, the fixing means (e.g., adhesive) can deteriorate with age, possibly causing the case (i.e., the holder) to be displaced with respect to the imaging element (i.e., the image sensor). This can cause the lens to fail to focus the incident light on the imaging element.

An object of the present disclosure is to provide a camera module that is unlikely to cause displacement of the holder with respect to the image sensor.

1. Definition

In the drawings, the z axis coincides with the optical axes of lenses 7a to 7d and of image sensor 5. The x and y axes are orthogonal to the z axis, and to each other. The direction opposite to the z axis is an example of a predetermined direction α.

2. First Exemplary Embodiment

Next, camera module 1 according to a first exemplary embodiment of the present disclosure will be described in detail with reference to the drawings mentioned above.

2-1. Structure of Camera Module 1

Figure 2:
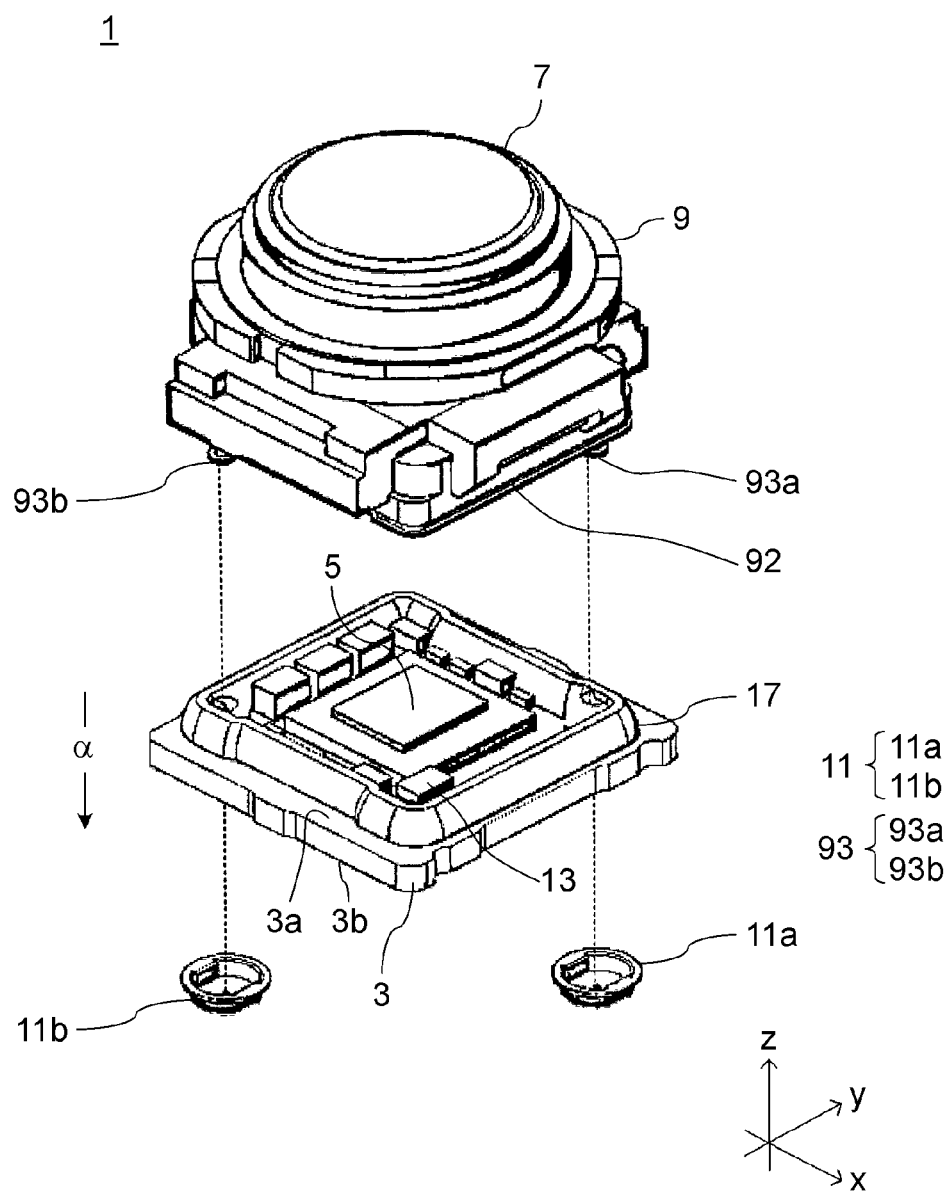
FIG. 2 is an exploded view of the camera module shown in FIG. 1 when seen from obliquely above.
Figure 3:
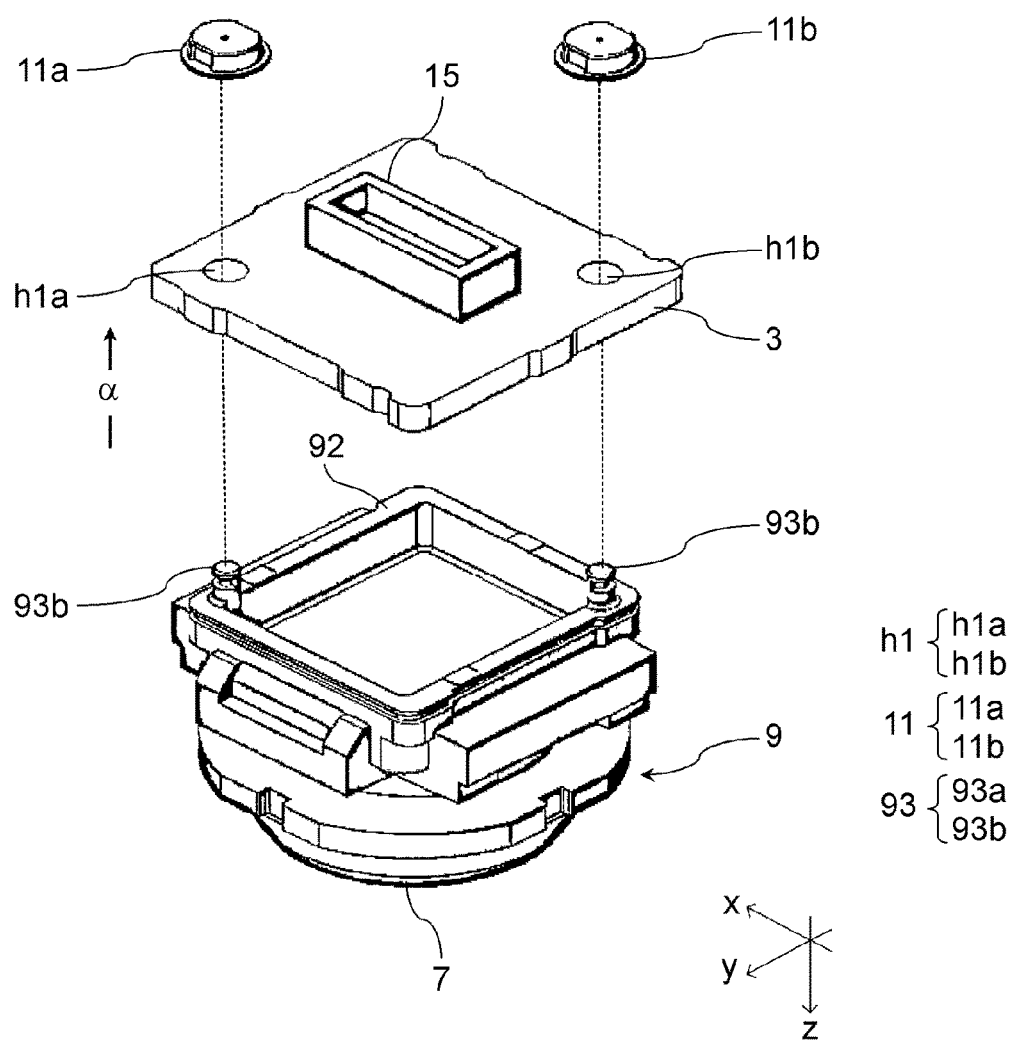
FIG. 3 is an exploded view of the camera module shown in FIG. 1 when seen from obliquely below.

In FIGS. 1 to 3, camera module 1 is for automotive applications. To be more specific, module 1 is used in a monitoring camera to be installed at the front, side, or back of a vehicle, or is used to automatically recognize people around the vehicle, other vehicles around the vehicle, or white lines on the road.

Camera module 1 roughly includes substrate 3, image sensor 5, at least one lens 7, lens barrel 9 as a holder, at least one cover 11, electronic component 13, connection component 15, and fixing part (adhesive) 17.

Substrate 3 is a printed wiring board made, for example, of glass-epoxy obtained by impregnating glass fiber with epoxy or other resins. Substrate 3 has first main surface 3a and second main surface 3b on the reverse side of substrate 3 from first main surface 3a in the predetermined direction α.

First main surface 3a is mounted with image sensor 5, which is typically a CCD or CMOS image sensor, and converts incident light into electricity. Sensor 5 takes out electric charge from each pixel sequentially, generates an electrical signal representing an image or a video, and outputs the signal after amplifying it.

Figure 4:
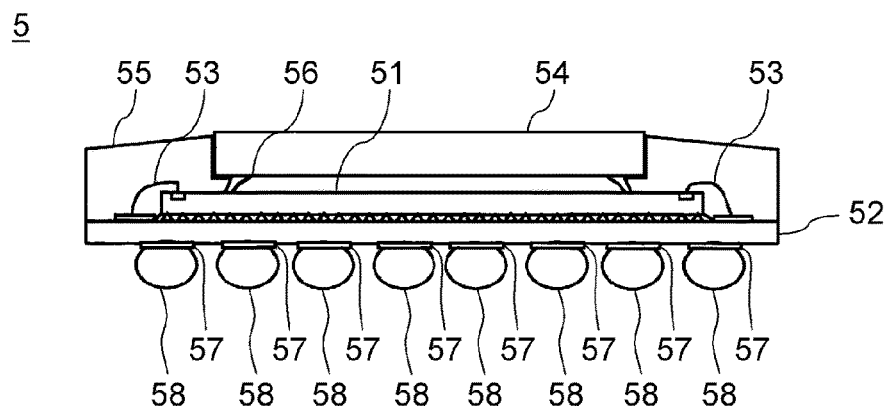
FIG. 4 is a vertical sectional view of the image sensor shown in FIG. 1.
Figure 4:
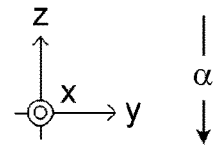

To be more specific, as shown in FIG. 4, image sensor 5 includes support substrate 52 and die 51 mounted on substrate 52. Die 51 is electrically connected to the wiring pattern on substrate 52 via bonding wire 53. Image sensor 5 further includes glass 54 above die 51 via a slight gap. Glass 54 is fixed to package 55 with adhesive 56 or the like. Substrate 52 is provided with a plurality of electrodes 57 on its back side. Image sensor 5 with the above-described structure is mounted on substrate 3 by, for example, surface mounting technology using electrodes 57. Electrodes 57 may be provided with solder balls 58, respectively.

Referring back to FIGS. 1 and 3, substrate 3 is provided with at least one hole h1 around image sensor 5. At least one hole h1 in the present exemplary embodiment includes two holes h1a and h1b, which are formed near diagonals of image sensor 5. Holes h1a and h1b in the present exemplary embodiment are cylindrical through-holes h1a and h1b extending between first main surface 3a and second main surface 3b. Through-holes h1a and h1b may be plated through-holes so as to avoid the release of dust from the edges of substrate 3, (that is, the rims of through-holes h1a and h1b).

Figure 5:
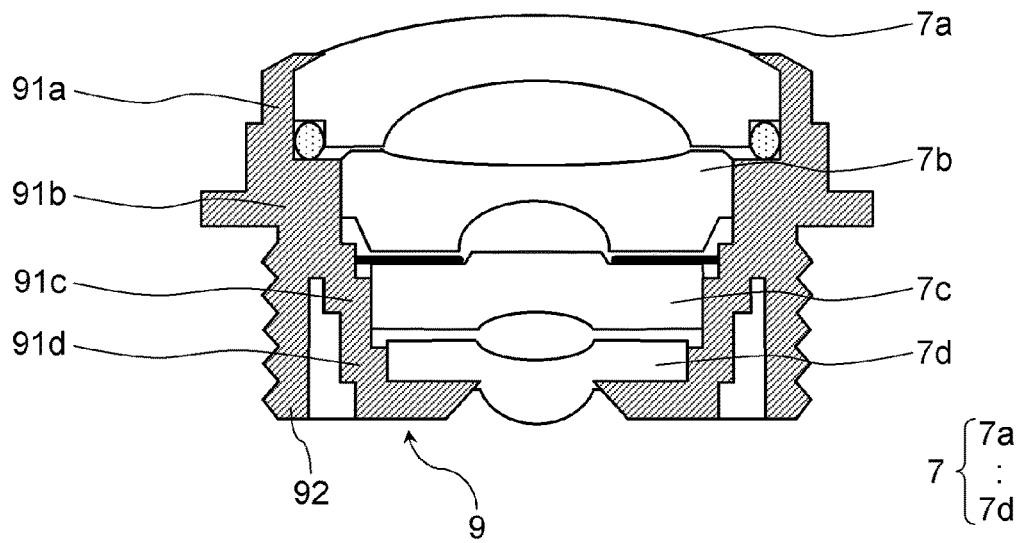
FIG. 5 is a vertical sectional view of a holder, a first lens, and so on, all of which are shown in FIG. 1.
Figure 5:
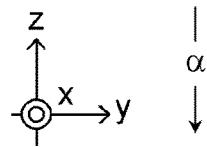

At least one lens 7 in the present exemplary embodiment includes first lens 7a, second lens 7b, third lens 7c, and fourth lens 7d as shown in FIG. 5, all of which are made of glass or resin. Lenses 7a to 7d are aligned such that optical axes of lenses 7a to 7d are coincident, are arranged in this order from the upstream of the optical path in the predetermined direction α, and are held in lens barrel 9 as will be described later. Of these four lenses, first lens 7a is closest to a subject of camera module 1. Second to fourth lenses 7b to 7d focus the light incident from first lens 7a onto image sensor 5.

Lens barrel 9 is approximately cylindrical and holds at least one lens 7. To be more specific, first to fourth lenses 7a to 7d are held in first holder 91a to fourth holder 91d, respectively, of lens barrel 9 and are fixed to these holders with adhesive or the like.

Lens barrel 9 has substrate supporter 92 at the end on the predetermined-direction-α side as shown in FIGS. 2 and 3. Substrate supporter 92 is supported by first main surface 3a of substrate 3 with adhesive 17 which will be described later, in such a manner that supporter 92 is in contact with first main surface 3a or supporter 92 is close to first main surface 3a.

Substrate supporter 92 has an end face on the predetermined-direction-α side. At least one boss 93 projects in the predetermined direction α from the end face. To be more specific, at least one boss 93 is approximately aligned with at least one hole h1 on the x-y plane, and is sized to be fitted into at least one hole h1.

At least one boss 93 in the present exemplary embodiment includes two bosses 93a and 93b. Bosses 93a and 93b are preferably spaced as far as possible from each other to support lens barrel 9 stably on substrate 3.

It is also preferable that at least one boss 93 is provided with groove 94 around its peripheral surface. In the present exemplary embodiment, bosses 93a and 93b are provided with grooves 94a and 94b, respectively, around their peripheral surfaces.

At least one cover 11 is preferably made of tinned plate or other metals, and in the present exemplary embodiment includes two covers 11a and 11b as typically shown in FIG. 1. Each of covers 11a and 11b is shaped like a hat. Each of covers 11a and 11b has an open end on the z-axis-direction side, and a closed end on the predetermined-direction-α side. In the present exemplary embodiment, each opening has a larger diameter than diameters of through-holes h1a and h1b.

Figure 6:
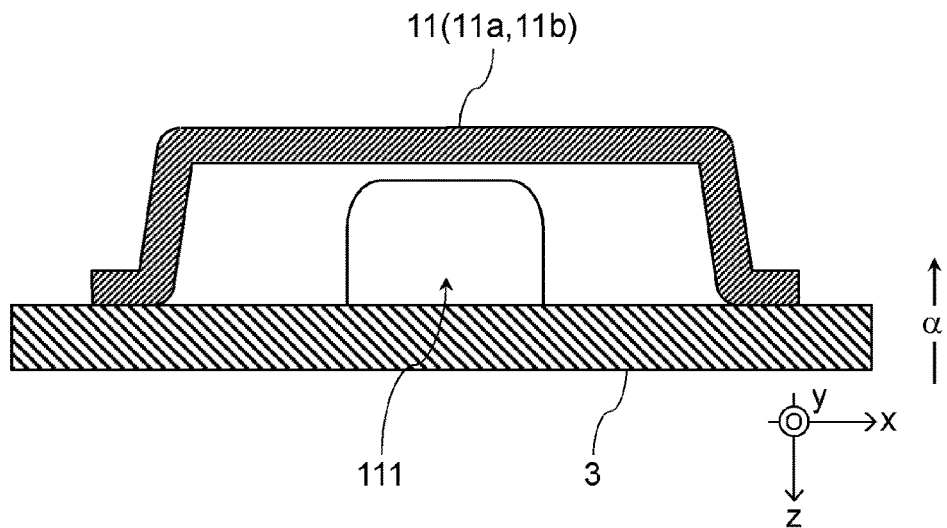
FIG. 6 is a vertical sectional view of a cover with a preferred structure shown in FIG. 1.
Figure 7:
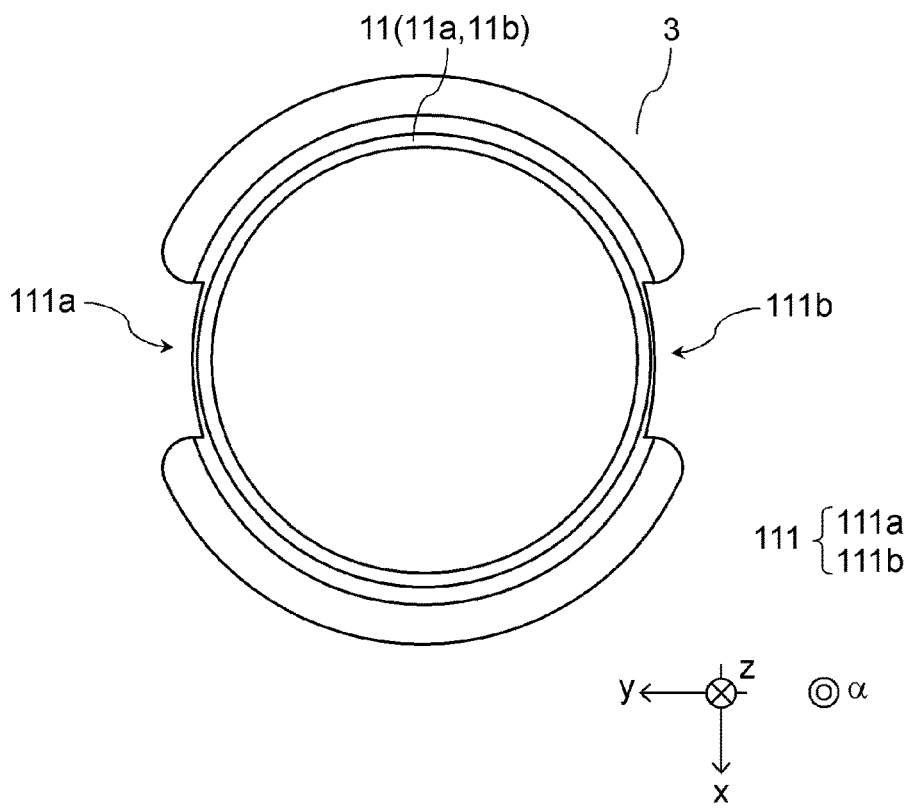
FIG. 7 is a bottom view of the cover shown in FIG. 6.

It is preferable that each of covers 11a and 11b is provided with at least one notch 111 on its side wall. In the present exemplary embodiment, each of covers 11a and 11b has two notches 111a and 111b as shown in FIGS. 6 and 7. Notches 111a and 111b are used, for example, to purge air during the manufacture of camera module 1.

Figure 8:
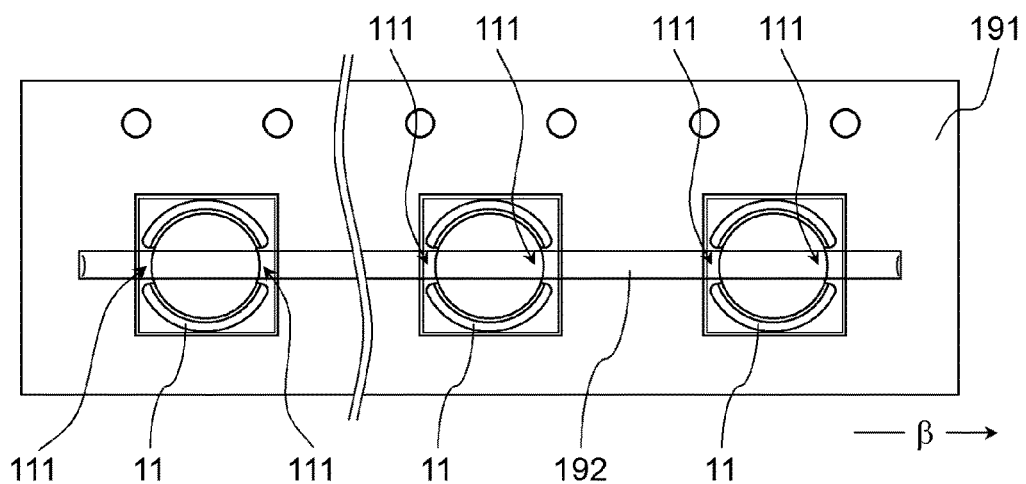
FIG. 8 shows the covers each shown in FIG. 7, and packed on a tape.

Covers 11 are mounted on second main surface 3b of substrate 3 by surface mounting technology. FIG. 8 shows covers 11 packed on a tape. In FIG. 8, carrier tape 191 is provided with embossed projections and an embossed line 192. The embossed projections are aligned in a drawing-out direction β so as to fit with the shape of covers 11, respectively, and embossed line 192 extends parallel to the drawing-out direction β and has a shape to fit with each notch 111 of each cover 11.

Referring back to FIGS. 1 to 3, an electronic circuit is formed on both of first main surface 3a and second main surface 3b, and either electronic component 13 and connection component 15 is mounted on surface 3a or 3b. Electronic component 13 can be, for example, a chip resistor, a chip capacitor, or an integrated circuit, while connection component 15 can be, for example, a connector. The connector is used to connect substrate 3 with an electronic circuit and/or a power supply circuit on an unillustrated external substrate. Via the connector, a driving voltage is supplied to image sensor 5 and other components, and an electrical signal is transmitted from image sensor 5 to the electronic circuit on the external substrate. Electronic component 13 and connection component 15 are mounted by surface mounting technology or other methods. For convenience of illustration, each drawing contains only one electronic component with a reference numeral. Alternatively, electronic component 13 and/or the electronic circuit can be embedded in substrate 3.

2-2. Assembly of Camera Module 1

The following describes in detail how camera module 1 is assembled.

Image sensor 5 is mounted on first main surface 3a of substrate 3 by surface mounting technology or other methods. FIG. 4 shows a packaged image sensor that has been surface-mounted. Instead of this, image sensor 5 may be electrically connected to the electronic circuit on substrate 3 via bonding wires or other connections, with die 51 (see FIG. 4) directly fixed to substrate 3.

Electronic component 13 and connection component 15 are mounted on substrate 3 by surface mounting technology or other methods.

As shown in FIGS. 2 and 3, covers 11a and 11b are mounted on through-holes h1a and h1b from the second main surface 3b of substrate 3 by surface mounting technology or other methods. To be more specific, as understood from FIG. 9, covers 11a and 11b are mounted on second main surface 3b in such a manner that the rims of the openings of covers 11a and 11b are out of the rims of through-holes h1a and h1b, respectively, when viewed two-dimensionally in the predetermined direction α. To be even more specific, in the example of FIG. 9, covers 11a and 11b are mounted on second main surface 3b in such a manner that the rims of the openings of covers 11a and 11b enclose the rims of through-holes h1a and h1b, respectively, when viewed two-dimensionally in the predetermined direction α. Accordingly, the rims of the openings of covers 11a and 11b are offset by a gap "g" from the rims of through-holes h1a and h1b in the direction away from the central axes of through-holes h1a and h1b (i.e., the centrifugal directions), respectively.

Next, adhesive (hereinafter, referred to as adhesive 17 for the sake of convenience) that is to be cured into fixing part 17 is prepared. Adhesive 17 can be, for example, an acrylic- or epoxy-based resin that can be cured with UV light and heat. Adhesive 17 can alternatively be a room-temperature-curable adhesive or a two-component adhesive.

Next, adhesive 17 is applied with a specified thickness to the region around image sensor 5 on first main surface 3a as shown in FIG. 2. To be more specific, adhesive 17 is applied to the region where substrate supporter 92 comes into contact with first main surface 3a when bosses 93a and 93b are inserted into through-holes h1a and h1b. In this case, adhesive 17 may be applied throughout the region where supporter 92 comes into contact with surface 3a. Alternatively, adhesive 17 may be applied only to several points in the region, such as diagonal two points at which lens barrel 9 and substrate 3 can be fixed together after the adjustment of the optical axis.

Figure 9:
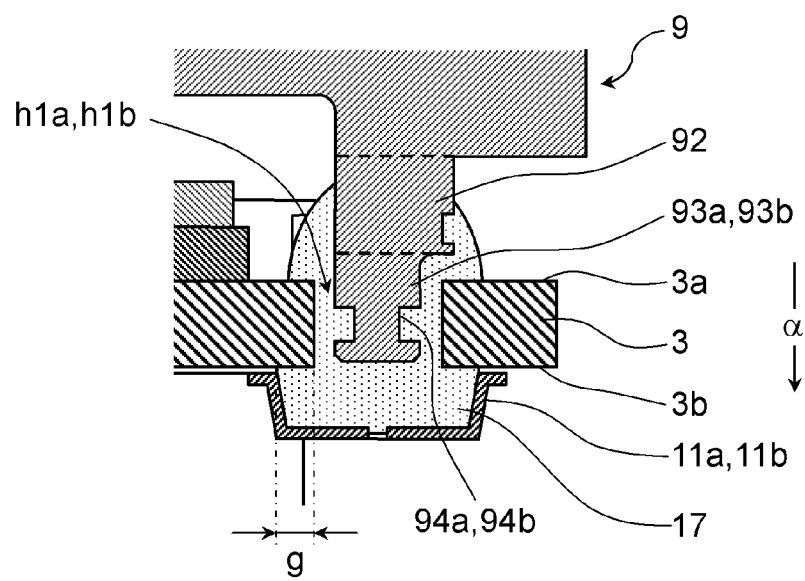
FIG. 9 is a vertical sectional view of an essential part of the camera module shown in FIG. 1.

Next, bosses 93a and 93b of lens barrel 9 are inserted into through-holes h1a and h1b while lens barrel 9 is being approached to first main surface 3a from above as shown in FIG. 3. Subsequently, a sufficient amount of adhesive 17 is injected into the gap between through-hole h1a and cover 11a and the gap between through-hole h1b and cover 11b without leaving any space in them as shown in FIG. 9. At this moment, air escapes through notches 111a and 111b (see FIG. 7), enabling covers 11a and 11b to be completely filled with adhesive 17. When adhesive 17 protrudes out through notches 111a and 111b, the operator can recognize the amount of injected adhesive 17 to be appropriate.

Next, at the same time as the completion of the injection of adhesive 17, the optical axis of the imaging face of image sensor 5 is aligned with the focal positions of lenses 7a to 7d. At this time, the inclination of each of the optical axes of lenses 7a to 7d is aligned with respect to the optical axis of image sensor 5 as well as the x, y, and z axis directions of lenses 7a to 7d are aligned with respect to the optical axis of image sensor 5, but also adjusts.

When the alignment of the optical axes is completed, adhesive 17 is cured with UV light, and thus lens barrel 9 and substrate 3 are temporarily fixed in position. Subsequently, adhesive 17 is cured with heat in, for example, a constant temperature chamber, thereby permanently fixing lens barrel 9 and substrate 3 in position. Alternatively, adhesive 17 can be thermally curable without the use of UV light, room-temperature curable, or two-component curable, depending on its curing properties. Adhesive 17 cured in this manner functions as fixing part 17.

If necessary, covers 11a and 11b may be electrically connected to the ground pattern provided on substrate 3. In this case, covers 11a and 11b are further connected to the shield surrounding camera module 1 and to the ground of the housing of module 1.

2-3. Roles and Effects of Fixing Part 17

In the present exemplary embodiment, the rims of the openings of covers 11a and 11b are offset from the rims of through-holes h1a and h1b, respectively, in the centrifugal directions (see FIG. 9). Therefore, adhesive 17 is filled into through-holes h1a and h1b from first main surface 3a and further into covers 11a and 11b until reaching second main surface 3b without leaving any space in them. After this, adhesive 17 is cured. As a result, fixing part 17 is formed into an anchor shape as shown in FIG. 9. Accordingly, adhesive 17 remains virtually undisplaced with respect to substrate 3 because of the anchor effect, even if the adhesive strength may lowered due to the aging degradation of adhesive 17, or fixing part 17 is partially peeled off from substrate 3 and creates space. This prevents displacement between lens barrel 9 and substrate 3, and hence misalignment of the optical axis between lenses 7a to 7d and image sensor 5.

Forming grooves 94a and 94b in bosses 93a and 93b makes fixing part 17 have a more complicated anchor shape as shown in FIG. 9. This enhances the prevention of misalignment of the optical axis between lenses 7a to 7d and image sensor 5.

As additional roles and effects, forming at least one notch 111 in each of covers 11a and 11b allows air to escape during the filling of adhesive 17. This enables adhesive 17 to be filled into covers 11a and 11b without leaving any space in them.

The protrusion of the adhesive out through notch 11 informs the operator that adhesive 17 has been fully filled into covers 11a and 11b without leaving any space in them.

Covers 11a and 11b made of metal can be easily mounted on second main surface 3b by soldering.

Covers 11a and 11b are electrically connected to the ground pattern of substrate 3 and also to the shield surrounding camera module 1 and to the ground of the housing of module 1. This stabilizes the ground potential of substrate 3, making camera module 1 more robust against electromagnetic compatibility (EMC) noise and other noises.

As shown in FIG. 8, carrier tape 191 has embossed line 192 extending parallel to the drawing-out direction β. Notches 111 of covers 11 are to be hooked onto embossed line 192. Thus, notches 111 of all covers 11 are positioned on carrier tape 191, so that when mounting covers 11 onto substrate 3, the surface mounter can align notches 111 of covers 11 in a predetermined direction. This prevents adhesive 17 that has protruded out through notches 111 from being applied onto other components.

3. Second Exemplary Embodiment

Next, camera module 1a according to a second exemplary embodiment of the present disclosure will be described in detail with reference to FIGS. 10 and 11.

3-1. Structure of Camera Module 1a

Figure 10:
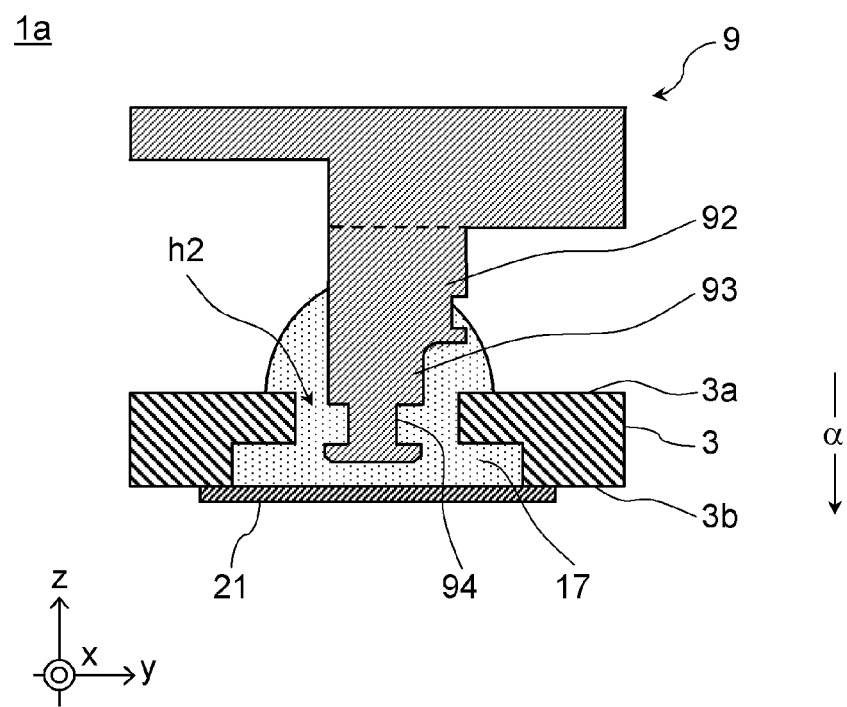
FIG. 10 is a vertical sectional view of an essential part of a camera module according to a second exemplary embodiment of the present disclosure.
Figure 11:
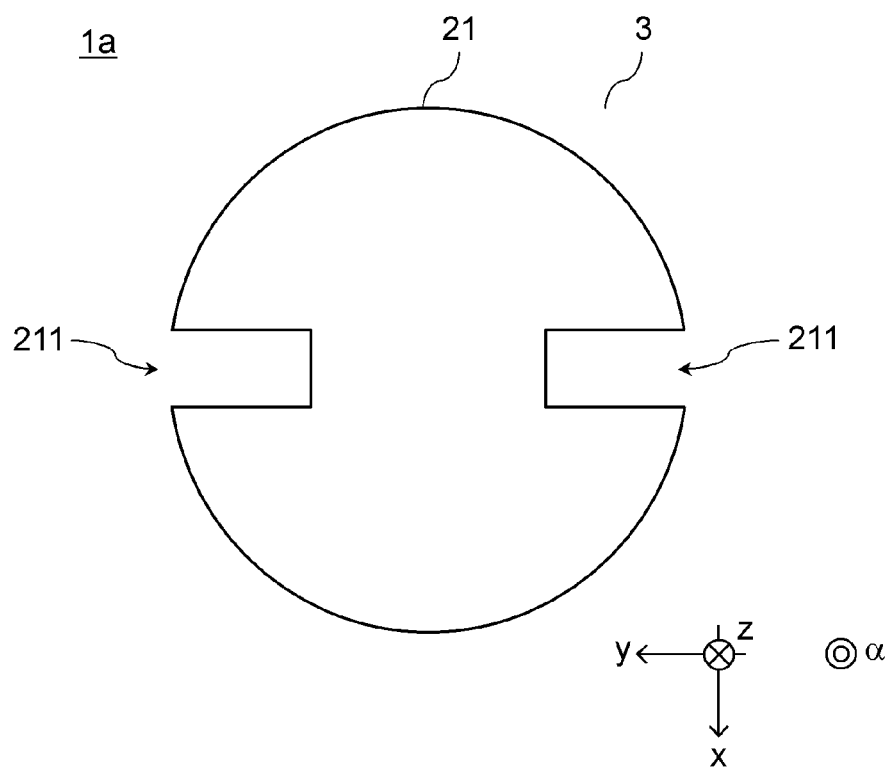
FIG. 11 is a bottom view of a cover shown in FIG. 10.
Figure 12:
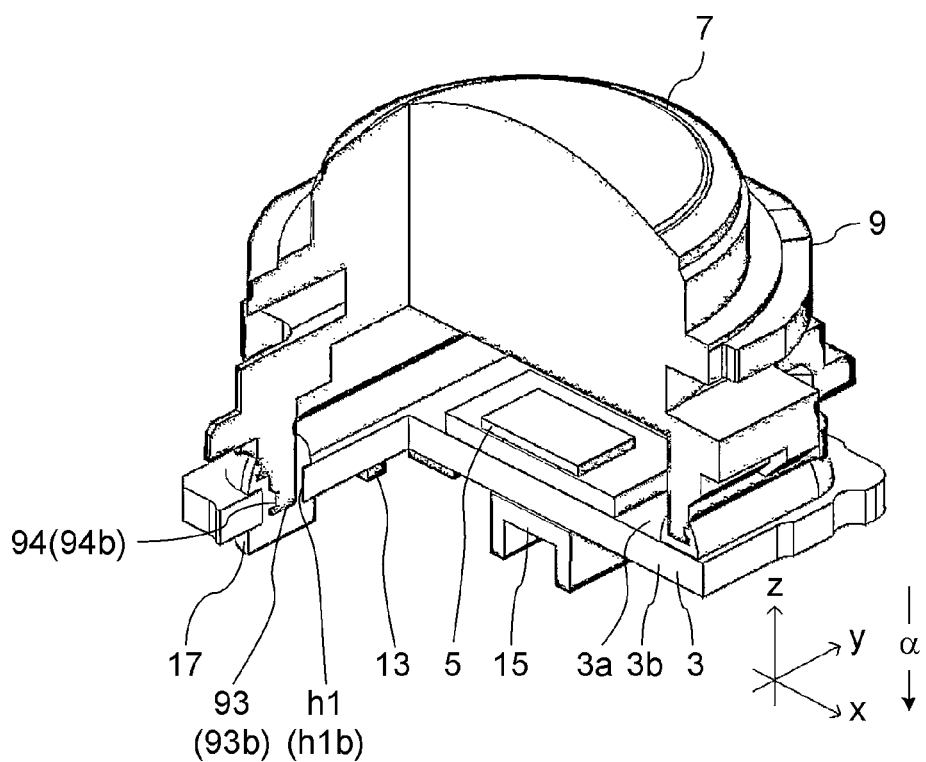
FIG. 12 is a partial sectional view of a camera module according to a third exemplary embodiment of the present disclosure.
Figure 13:
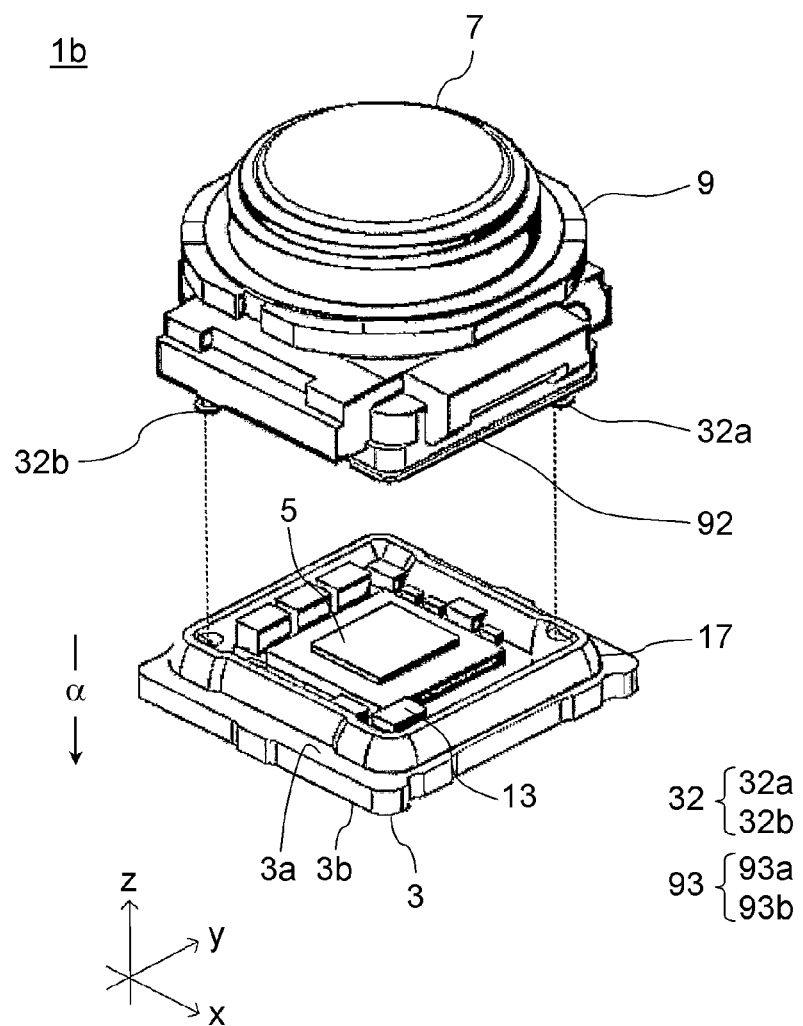
FIG. 13 is an exploded view of the camera module shown in FIG. 12 when seen from obliquely above.
Figure 14:
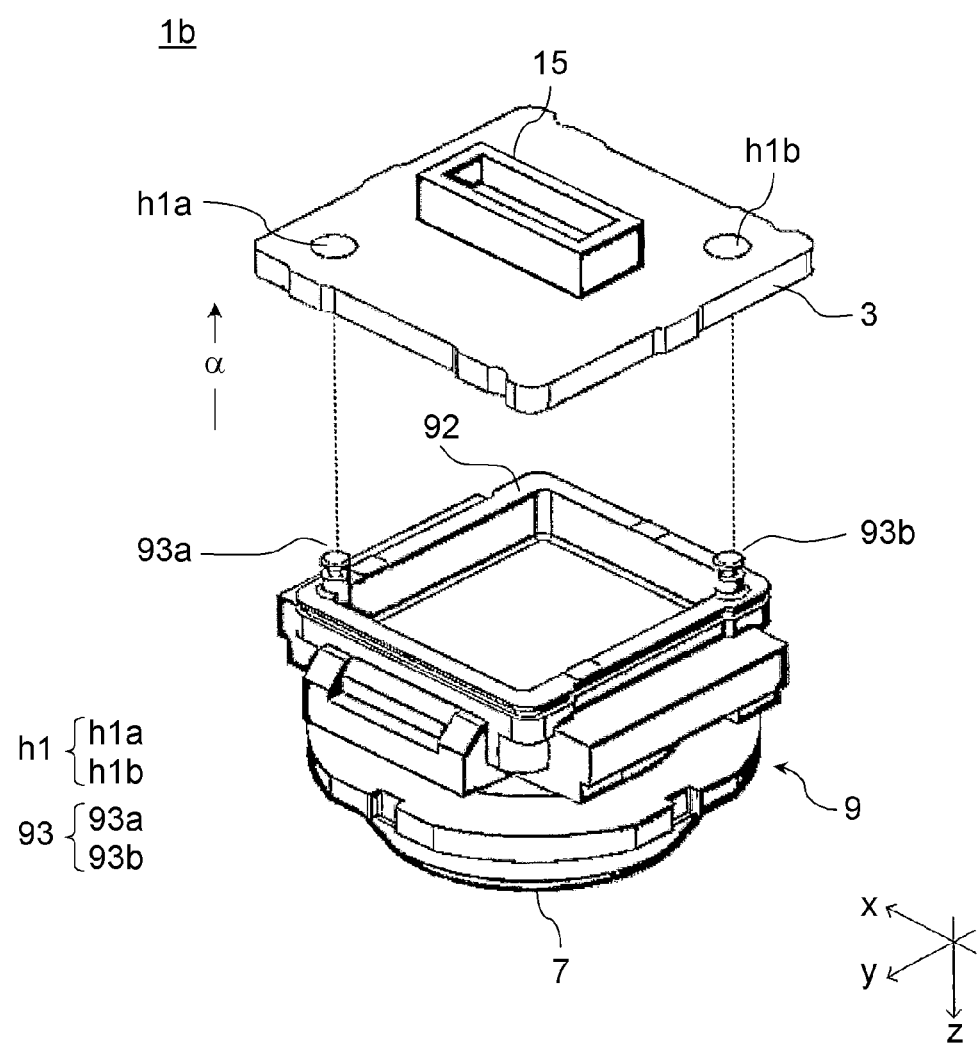
FIG. 14 is an exploded view of the camera module shown in FIG. 12 when seen from obliquely below.

Camera module 1a shown in FIGS. 10 and 11 differs from camera module 1 only in that substrate 3 has at least one hole h2 and at least one cover 21 instead of at least one hole h1 and at least one cover 11, respectively. Because of the similarities between modules 1 and 1a, in FIGS. 10 and 11, like components are labeled with the same reference numerals with respect to FIGS. 7 and 9, and hence, the description thereof will be omitted.

At least one hole h2 differs from at least one hole h1 only in shape, and hence, what they have in common will not be described.

Hole h2 in the present exemplary embodiment is through-hole h2 extending between first main surface 3a and second main surface 3b. Hole h2 has an opening on first main surface 3a smaller in diameter than an opening on second main surface 3b.

At least one cover 21 is an approximately circular plate with notch 211 at a predetermined position. To be more specific, cover 21 has a larger diameter than the opening of hole h2 on second main surface 3b. The shortest distance between the center of cover 21 and notch 211 is shorter than the diameter of the opening of hole h2 on second main surface 3b.

3-2. Assembly of Camera Module 1a

The following describes in detail how camera module 1a is assembled.

Similar to the description in section 2-2 above, image sensor 5, electronic component 13, and connection component 15 are mounted on substrate 3 by surface mounting technology or other methods.

As shown in FIGS. 10 and 11, at least one cover 21 is mounted on through-hole h2 from second main surface 3b of substrate 3 by surface mounting technology or other methods. To be more specific, cover 21 is mounted on second main surface 3b in such a manner that the peripheral line of cover 21 is out of the rim of through-hole h2 when viewed two-dimensionally in the predetermined direction α. To be even more specific, cover 21 is mounted on second main surface 3b in such a manner that the periphery (rim) of the disk-shaped part of cover 21 is outside the periphery (rim) of through-hole h2 and that notch 211 crosses the periphery of through-hole h2 when viewed two-dimensionally in the predetermined direction α.

Next, in the same manner as described in section 2-2 above, adhesive 17, which is to be cured into fixing part 17, is injected from the opening on first main surface 3a into a space defined by through-hole h2 and cover 21. The subsequent operations are the same as described in section 2-2.

3-3. Roles and Effects of Fixing Part 17

Similar to the description in section 2-3 above, adhesive 17 in the present exemplary embodiment is filled into through-hole h2 from first main surface 3a without leaving any space in it, and is then cured. As a result, fixing part 17 is formed into an anchor shape as shown in FIG. 10. Fixing part 17 remains virtually undisplaced with respect to substrate 3 because of the anchor effect, even if adhesive 17 loses its adhesive strength with time. This prevents displacement between lens barrel 9 and substrate 3, and hence misalignment of the optical axis between lenses 7a to 7d and image sensor 5.

Additional roles and effects are similar to those in section 2-3, and hence, the description thereof will be omitted.

3-4. Additional Notes

If substrate 3 is a multilayer board, at least one layer of the multilayer board on the predetermined-direction-α side can have the same function as cover 21, and the remaining layers may be provided with a semi-through-hole extending through these layers and having the same shape as through-hole h2.

4. Third Exemplary Embodiment

Next, camera module 1b according to a third exemplary embodiment of the present disclosure will be described in detail with reference to FIGS. 12 to 15.

4-1. Structure of Camera Module 1b

Camera module 1b shown in FIGS. 12 to 15 roughly differs from camera module 1 only in not having at least one cover 11. Consequently, in FIGS. 12 to 15, like components are labeled with the same reference numerals with respect to FIGS. 1 to 9, and hence, the description thereof will be omitted.

4-2. Assembly of Camera Module 1b

The following describes in detail how camera module 1b is assembled.

Similar to the description in 2-2 above, image sensor 5, electronic component 13, and connection component 15 are mounted on substrate 3 by surface mounting technology or other methods.

Figure 15:
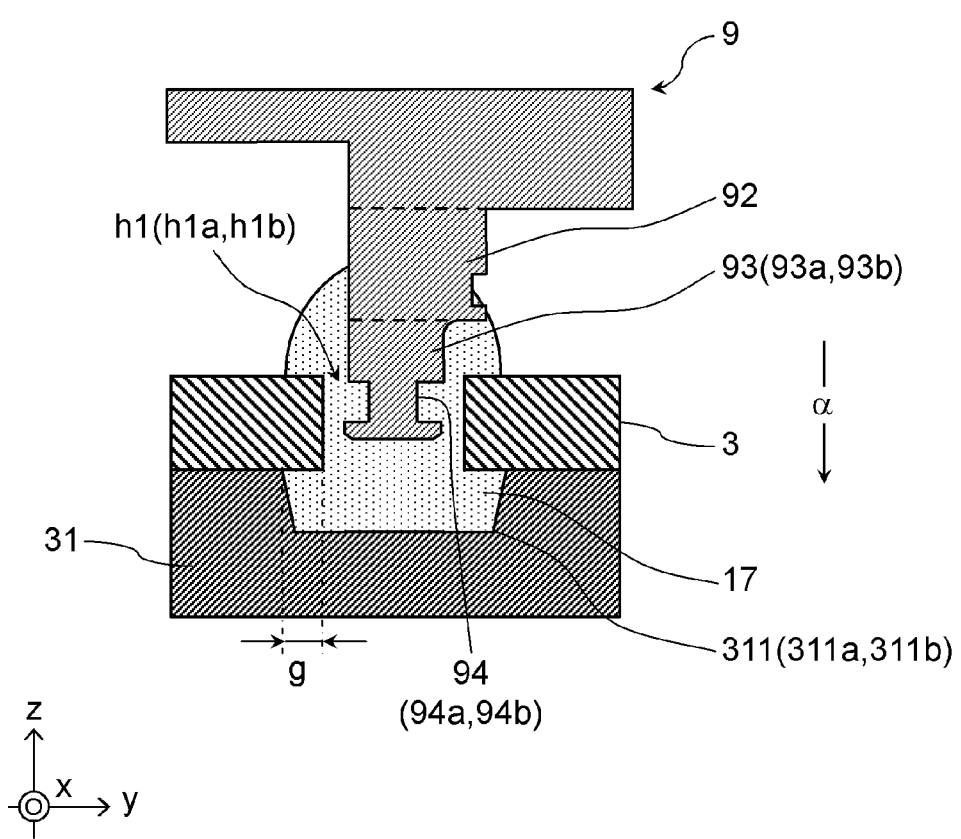
FIG. 15 is a vertical sectional view of an essential part of the camera module shown in FIG. 12.

Next, jig 31 shown in FIG. 15 is prepared. The end face of jig 31 on the z-axis-direction side (hereinafter, the upper surface) is approximately parallel to the x-y plane. The upper surface of jig 31 has recess (counterbored hole) 311, in the position corresponding to at least one through-hole h1. Camera module 1b according to the present exemplary embodiment is provided with through-holes h1a and h1b, and hence, jig 31 has recesses (counterbored holes) 311a and 311b in the positions corresponding to through-holes h1a and h1b, respectively. The opening diameters of recesses 311a and 311b are larger than the diameters of through-holes h1a and h1b, respectively.

Substrate 3, which is mounted with image sensor 5 and other components, is attached to jig 31. To be more specific, substrate 3 is attached to jig 31 in such a manner that as shown in FIG. 15, the rims of the openings of recesses 311a and 311b are out of the rims of through-holes h1a and h1b, respectively, when viewed two-dimensionally in the predetermined direction α. To be even more specific, substrate 3 is attached to jig 31 in such a manner that the rims of the openings of recesses 311a and 311b enclose the rims of through-holes h1a and h1b when viewed two-dimensionally in the predetermined direction α. Accordingly, the rims of the openings of recesses 311a and 311b are offset by a gap "g" from the rims of through-holes h1a and h1b in the direction away from the central axes of through-holes h1a and h1b, respectively.

Next, adhesive 17, which is to be cured into fixing part 17, is injected from the opening on first main surface 3a into a space defined by through-holes h1a and h1b and recesses 311a and 311b, respectively, in the same manner as in section 2-2.

Next, at the same time as the completion of the injection of adhesive 17, the optical axis is aligned in the same manner as in section 2-2. The subsequent operations are the same as described in section 2-2.

4-3. Roles and Effects of Fixing Part 17

Similar to the description in section 2-3 above, adhesive 17 in the present exemplary embodiment is filled into through-holes h1a and h1b from first main surface 3a without leaving any space in them, and is then cured. As a result, fixing part 17 is formed into an anchor shape as shown in FIG. 15. Fixing part 17 remains virtually undisplaced with respect to substrate 3 because of the anchor effect, even if the adhesive strength may lowered due to the aging degradation of adhesive 17. This prevents displacement between lens barrel 9 and substrate 3, and hence, misalignment of the optical axes between lenses 7a to 7d and image sensor 5.

Additional roles and effects are similar to those in section 2-3, and hence, the description thereof will be omitted.

As described above, the camera module according to the present disclosure is unlikely to cause displacement of the holder with respect to the image sensor. Therefore, this camera module is suitable for use in vehicles.

What is claimed is:

1. A camera module comprising:
   a substrate having a first main surface mounted with an image sensor, and a second main surface on a reverse side of the substrate from the first main surface in a predetermined direction, and being provided with a hole extending from the first main surface in the predetermined direction;

a holder having a boss inserted into the hole from the first main surface, the holder holding at least one lens; and a fixing part made of adhesive that is cured into an anchor shape, the fixing part fixing the boss inside the hole.

2. The camera module according to claim 1, wherein a peripheral surface of the boss is provided with a groove.

3. The camera module according to claim 1, wherein the hole is a through-hole, and the fixing part projects out of the through-hole in the predetermined direction and covers at least a part of the second main surface.

4. The camera module according to claim 1, wherein the hole is a through hole.

5. The camera module according to claim 1, wherein the anchor shape is a T-shape.

6. The camera module according to claim 1, wherein the anchor shape is an H-shape sandwiching at least a portion of the substrate therebetween.

7. A camera module comprising:

a substrate having a first main surface mounted with an image sensor, and a second main surface on a reverse side of the substrate from the first main surface in a predetermined direction, and being provided with a hole extending from the first main surface in the predetermined direction;

a holder having a boss inserted into the hole from the first main surface, the holder holding at least one lens; and a fixing part made of adhesive that is cured into an anchor shape, the fixing part fixing the boss inside the hole, wherein the hole is a through-hole, the camera module further comprises a cover covering the through-hole on the second main surface, the cover is recessed in the predetermined direction and is provided with an opening, and a rim of the opening of the cover is out of a rim of an opening of the through-hole when viewed two-dimensionally in the predetermined direction.

8. The camera module according to claim 7, wherein the cover is further provided with a notch.

9. The camera module according to claim 7, wherein the cover is formed of a conductor, and is electrically connected to a ground of the substrate.

10. The camera module according to claim 7, wherein a peripheral surface of the boss is provided with a groove.

11. A camera module comprising:

a substrate having a first main surface mounted with an image sensor, and a second main surface on a reverse side of the substrate from the first main surface in a predetermined direction, and being provided with a hole extending from the first main surface in the predetermined direction;

a holder having a boss inserted into the hole from the first main surface, the holder holding at least one lens; and a fixing part made of adhesive that is cured into an anchor shape, the fixing part fixing the boss inside the hole, wherein the hole is a through-hole, and a diameter of an opening of the through-hole on the second main surface is larger than a diameter of another opening of the through-hole on the first main surface when viewed two-dimensionally in the predetermined direction.

12. The camera module according to claim 11, wherein a peripheral surface of the boss is provided with a groove.

* * * * *